3,357,983
PERYLENE PIGMENTS
Earl Weener and John Herman Vander Ploeg, Holland, Mich., assignors, by mesne assignments, to Chemetron Corporation, Chicago, Ill., a corporation of Delaware
No Drawing. Filed Oct. 13, 1965, Ser. No. 495,729
8 Claims. (Cl. 260—281)

This invention relates to novel aromatic amine substituted perylene pigments. More particularly, this invention relates to novel derivatives of perylene characterized by the formula:

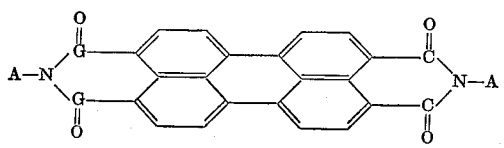

wherein A represents a lower alkyl substituted pyridine group which is attached to the imide nitrogen through a nuclear carbon atom. The lower alkyl substituents comprise 1–5 carbon atoms such as methyl, ethyl, propyl, isopropyl, butyl, isobutyl, amyl, isoamyl, and the like, and one or more such alkyl groups are attached to the pyridine nucleus.

Aromatic amine substituted perylene pigments have been prepared according to the processes described in U.S. Patents 2,543,747 and 2,715,127 as well as German Patent 1,132,272. All of the foregoing patents illustrate the typical general reaction between 3,4,9,10-perylene tetracarboxylic acid anhydride and an aromatic amine with 2-amino pyridine being the particular organic amine employed in the German process. When the previously described anhydride was reacted with 2-amino pyridine a dyestuff was obtained having acceptable color properties but did not possess the necessary transparency required for use in making metallized finishes. Neither did the pigment produced by the German patent have the purity of hue essential for commercially acceptable pigments.

It is therefore an object of the present invention to provide a novel perylene type pigment. It is a further object of the present invention to provide a novel aromatic amine substituted perylene pigment which is highly transparent and has a high purity of hue. A further object of this invention is to provide a novel aromatic amine substituted perylene pigment which can be prepared economically without the need of special equipment, solvents, or long reaction times. These and other objects and advantages of the invention will be apparent from a consideration of the following detailed description and examples.

Quite unexpectedly, it was found that when a lower alkyl substituted amino pyridine was reacted with 3,4,9,10-perylene tetracarboxylic acid dianhydride, a pigment was synthesized which has all the color properties to make it a commercially acceptable pigment. The N,N'-bis(lower alkyl substituted pyridyl) 3,4,9,10-perylene tetracarboxylic diimides, were found to have a transparency and purity of hue not possessed by the unsubstituted derivatives. The reaction between the anhydride and the particular pyridine is best carried out with a slight molecular excess of the pyridine and in an organic solvent such as trichlorobenzene or quinoline. Temperatures in the range of 200–210° C. are preferred in conjunction with a reaction time in the range of from 3–12 hours depending on the particular amino pyridine while water of condensation is continuously distilled from the reaction mixture. The novel N,N'-bis(lower alkyl substituted pyridyl)3,4,9,10-perylene tetracarboxylic diimides are recovered as solid precipitates which do not melt up to temperatures of 300° C.

The invention is disclosed in further detail by means of the following examples which are set forth for the purpose of illustrating the invention, but, in no way are to be considered as limiting the invention in spirit or scope. The parts indicated in the examples are weight parts and the exemplified synthesis were carried out where the weight parts were in grams.

EXAMPLE I

N,N'-bis(5-methyl-2-pyridyl)3,4,9,10-perylene tetracarboxylic diimide

Into a one liter, round bottom, three-neck flask equipped with a stirrer, a thermometer and a take off condenser to remove water of condensation are placed 350 parts of trichlorobenzene. To the trichlorobenzene solvent are added with stirring 40 parts of 3,4,9,10-perylene tetracarboxylic acid dianhydride and 32.4 parts of 2-amino-5-methyl pyridine. The reaction mixture is heated for 12 hours at 210° C. while continuously distilling off the water of condensation. A solid product forms which is suction filtered and washed several times with n-propanol, boiled with dilute sodium hydroxide solution for one-half hour and subsequently washed with water.

The desired red dyestuff, N,N'-bis(5-methyl-2-pyridyl) 3,4,9,10-perylene tetracarboxylic diimide crystallizes from trichlorobenzene in the form of flat platelets, does not melt at a temperature up to 300° C., is substantially insoluble in the customary organic solvents such as ethyl alcohol, methyl-ethyl-ketone and toluene and dissolves in concentrated sulfuric acid to a deep red color with red fluorescence.

EXAMPLE II

N,N'-bis(4,6-dimethyl-2-pyridyl)3,4,9,10-perylene tetracarboxylic diimide

Employing the reaction equipment specified in Example I, 40 parts of perylene-3,4,9,10-tetracarboxylic acid dianhydride, 21.2 parts concentrated hydrochloric acid and 28.1 parts 2-amino-4,6-dimethyl pyridine are added with stirring to 400 parts of quinoline. The reaction mixture is heated for 12 hours at 200–210° C. while continuously distilling off the water of condensation.

The desired product, N,N'-bis(4,6-dimethyl-2-pyridyl)-3,4,9,10-perylene tetracarboxylic diimide is then suction filtered and worked up as described in Example I.

The desired red dyestuff crystallizes from quinoline as fine crystals, does not melt at temperatures up to 300° C., is substantially insoluble in the previously indicated organic solvents and dissolves in sulfuric acid to a violet color without fluorescence.

EXAMPLE III

N,N'-bis(6-methyl-2-pyridyl)3,4,9,10-perylene tetracarboxylic diimide

The same procedure and materials as described in Example I are utilized except that 2-amino-6-methyl pyridine is employed in place of 2-amino-5-methyl pyridine. The reaction mixture is also heated for 12 hours at 210° C. while continuously distilling off the water of condensation. The work up of the desired red dyestuff, N,N'-bis(6-methyl-2-pyridyl)3,4,9,10-perylene tetracarboxylic diimide is as described in Example I and crystallizes from trichlorobenzene as fine crystals, does not melt at a temperature up to 300° C., is substantially insoluble in the previously indicated organic solvents and dissolves in sulfuric acid to a deep red color with a red fluorescence.

EXAMPLE IV

*N,N'-bis(4-methyl-2-pyridyl)3,4,9,10-perylene tetracarboxylic diimide*

The same procedure and materials as described in Example I are utilized except that 2-amino-4-methyl pyridine in employed in place of the therein indicated pyridine. After heating the reaction mixture for 9 hours at 210° C. the desired product, N,N'-bis(4-methyl-2-pyridyl)3,4,9,10-perylene tetracarboxylic diimide is suction filtered and worked up as described in Example I.

The desired red dyestuff crystallizes from trichlorobenzene as fine crystals, does not melt at a temperature up to 300° C., is substantially insoluble in the previously indicated organic solvents but dissolves in sulfuric acid to a deep red color with red fluorescence.

EXAMPLE V

*N,N'-bis(3-methyl-2-pyridyl)3,4,9,10-perylene tetracarboxylic diimide*

The same procedure and materials as described in Example I are utilized except that 2-amino-3-methyl pyridine is employed in place of 2-amino-5-methyl pyridine. After heating the reaction mixture for 9 hours at 210° C. while continuously distilling off the water of condensation there is obtained by suction filtration N,N'-bis(3-methyl-2-pyridyl)3,4,9,10-perylene tetracarboxylic diimide which is worked up as described in Example I.

The desired red dyestuff crystallizes from trichlorobenzene as fine crystals, does not melt at a temperature up to 300° C., is substantially insoluble in the previously indicated organic solvents, but dissolves in sulfuric acid to a deep red color with a red fluorescence.

EXAMPLE VI

All of the pigments produced in Example I–V are distinguished by extraordinary brilliance and excellent fastness properties both in lacquer and vinyl plastics. They possess very good fastness to solvents, to bleeding and to light and are water insoluble. The pigments produced in Examples I–V are made into suitable pigmentary forms by one of several methods which include vatting, acid pasting, or blending in a ball mill with a water soluble salt such as sodium chloride, all of these procedures being well known and common to the industry. The pigmentary coloring forms in the form of water wet presscake can be further processed into the following useful applications indicated in Examples VII and VIII.

EXAMPLE VII

The pigment presscakes from Example VI are oven dried at about 70° C. to remove water, and are micro-pulverized to a fine powder. Equal parts of the ground pigment, and polyvinyl chloride are mixed and dispersed by two roll milling until a uniform sheet of dispersed pigment in polyvinyl chloride is produced. After cooling, the colored plastic sheet is chipped in a hammer mill, the resulting product being ready for use as a concentrated coloring material for coloring vinyl based plastics and inks. The colored chips dissolved in a vinyl resin solution and cast on a glass surface, give a pleasing red color characterized by excellent clarity and gloss and having excellent fastness to light.

EXAMPLE VIII

The water wet presscakes of Example VI containing 400 parts dry pigment are flushed into 2000 parts of a vehicle such as an acrylic resin solution which in this instance is Du Pont RC–6011, a 40% solution of poly-(methyl methacrylate) in toluene and acetone, by mixing in a sigma blade dough mixer. Water is removed by pouring off and vacuum drying the mass at a temperature of 60° C. until all water is removed. The stiff mass is mixed for a period of one to two hours and then more toluene added to bring the concentration of the pigment in the mass to approximately 10%. The finished dispersion products so obtained are very desirable for tinting paints such as thermoplastic acrylic paints and are especially adaptable for manufacturing metallized thermoplastic acrylic paints having a high "two toneness," flash, transparency and hue, properties desired by automotive stylists.

In the foregoing examples mono and dimethyl substituted amino pyridines of varying isomeric configuration are reacted with perylene-3,4,9,10-tetracarboxylic acid dianhydride. If desired a tri, quaternary or penta methyl substituted pyridine can be reacted with the indicated dianhydride to give the corresponding tri, quaternary or penta methyl substituted pyridyl perylene-3,4,9,10-tetracarboxylic diimide. Similarly, other lower alkyl substituted amino pyridines, such as those substituted with ethyl, propyl, isopropyl, butyl, isobutyl, amyl, isoamyl, and the like groups, can be reacted with the indicated dianhydride to give the corresponding mono, di, tri or quaternary or penta lower alkyl substituted pyridyl perylene diimide.

It will thus be seen that there is now provided novel aromatic amine substituted perylene pigments having properties heretofore unknown in this class of pigments. All of the presently described novel pigments are useful in metallized finishes where high transparency is required. All of the pigments are easily manufactured and processed into pigmentary forms by standard procedures and are readily dispersed into paints, inks and plastics.

Others may practice the invention in any of the numerous ways which will be suggested by this disclosure to one skilled in the art by employing one or more of the novel features disclosed or equivalents thereof. All such practice of the invention is considered to be a part hereof provided it falls within the scope of the appended claims.

We claim:

1. A compound of the general formula:

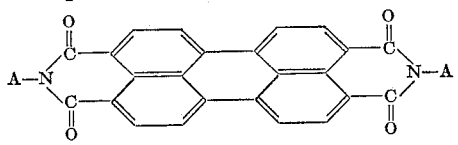

wherein each A is a pyridine substituted by methyl or hydrogen on the nuclear carbons wherein the pyridine group is linked to the imide nitrogen through a nuclear carbon atom.

2. A compound of the general formula:

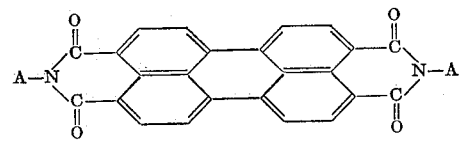

wherein each A is independently a dilower alkyl substituted pyridine group wherein the pyridine is linked to the imide nitrogen through a nuclear carbon atom and said lower alkyl groups have 1–5 carbon atoms and linked to a nuclear carbon atom.

3. A compound of the general formula:

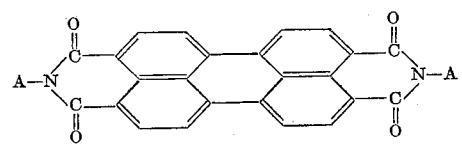

wherein A is a mono lower alkyl substituted pyridine group wherein the pyridine is linked to the imide nitrogen through a nuclear carbon atom and said lower alkyl contains 1–5 carbon atoms.

4. N,N'-bis(5-methyl-2-pyridyl)3,4,9,10-perylene tetracarboxylic diimide.

5. N,N' - bis(4,6-dimethyl-2-pyridyl)3,4,9,10-perylene tetracarboxylic diimide.

6. N,N'-bis(6-methyl-2-pyridyl)3,4,9,10-perylene tetracarboxylic diimide.
7. N,N'-bis(4-methyl-2-pyridyl)3,4,9,10-perylene tetracarboxylic diimide.
8. N,N'-bis(3-methyl-2-pyridyl)3,4,9,10-perylene tetracarboxylic diimide.

References Cited

UNITED STATES PATENTS 3,006,882  10/1961  Altermatt et al. ____ 260—281 X

FOREIGN PATENTS 1,132,272  6/1962  Germany.
1,267,372  6/1961  France.

OTHER REFERENCES

Klingsberg: Pyridine, Part II, Interscience, 1911, pp. 234–9.

ALEX MAZEL, *Primary Examiner.*

D. G. DAUS, *Assistant Examiner.*

UNITED STATES PATENT OFFICE
CERTIFICATE OF CORRECTION

Patent No. 3,357,983                                December 12, 1967

Earl Weener et al.

It is hereby certified that error appears in the above numbered patent requiring correction and that the said Letters Patent should read as corrected below.

Column 1, lines 15 to 20, the formula should appear as shown below instead of as in the patent:

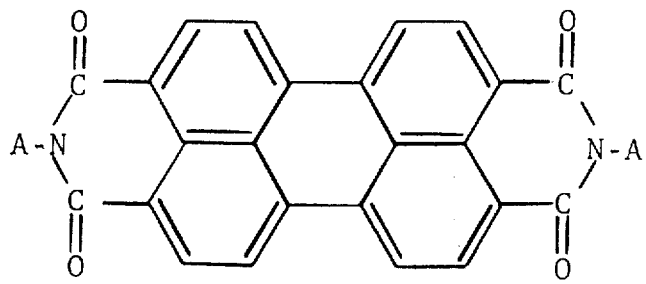

Signed and sealed this 25th day of February 1969.

(SEAL)
Attest:

EDWARD M. FLETCHER, JR.                         EDWARD J. BRENNER
Attesting Officer                               Commissioner of Patents

Disclaimer 3,357,983.—*Earl Weener* and *John Herman Vander Ploeg*, Holland, Mich. PERYLENE PIGMENTS. Patent dated Dec. 12, 1967. Disclaimer filed Aug. 11, 1972, by the assignee, *Chemetron Corporation*.
Hereby enters this disclaimer to claim 1 of said patent.
[*Official Gazette January 16, 1973.*]